United States Patent Office 3,206,297
Patented Sept. 14, 1965

3,206,297
SLOW RELEASE FERTILIZERS
Buell O'Connor, Houston, Tex., assignor to Standard Oil Company, Chicago, Ill., a corporation of Indiana
No Drawing. Filed Mar. 1, 1963, Ser. No. 262,182
3 Claims. (Cl. 71—28)

This invention relates to slow release fertilizer compositions and to a method for their manufacture.

Inorganic chemicals used in compounding fertilizers are very soluble in water and are rapidly leached from the soil. Increased use of sources of nitrogen derived from ammonia in place of organic nitrogen has aggravated the loss of fertilizer ingredients resulting from their high solubility. The high solubility of inorganic chemical fertilizer ingredients is detrimental to plants since frequently the plants are exposed to short periods of high concentration of the chemicals which cause extensive damage. It is desirable to provide water-soluble fertilizer ingredients in a form which will slowly release the nutrients to minimize loss and damage to the plants.

Previously, the slow release of solid fertilizer ingredients to the soil has been attempted by mixing the fertilizer ingredients with an inert, or essentially inert, binding material. Thus, peat moss, vermiculite, diatomaceous earth, various siliceous minerals, kieselguhr, and the like, have been suggested for incorporation into fertilizers in an attempt to retard the general rapid rate of leaching out of the fertilizer ingredients by rainfall and ground water. However, in each of such compositions, the fertilizer ingredients are still so readily available that hard rains cause accelerated and wasteful consumption of the highly soluble fertilizer nutrients by the plants. Under conditions of soaking rains, the concentration of fertilizer in the vicinity of the plant roots may be so great as to cause actual damage to the plants, just as if unbinded fertilizer had been applied directly to the plants. On the other hand, much of the distributed fertilizer will remain in solid form during a dry spell, and then when it rains, a good deal of it may be dissolved and washed away by run-off water. Because of uncontrollable rates of solubility in water, the plant nutrients will not be realized. Thus, according to long-established practices, the rate of leaching of these fertilizers has been left to the vagaries of nature.

One of the requirements of any fertilizer is that it must be in condition to be distributed satisfactorily from a fertilizer distributor. Many commercially prepared fertilizers tend to cake or become sticky during storage, shipping, or after they are received by the customer. This condition greatly impairs the drillability of the fertilizer and increases the cost of its uniform distribution in the field. This condition can be partially relieved by producing the fertilizer in the form of granules, by storing and shipping the fertilizer in moisture-proof containers and by use of various water-proofing or conditioning agents.

Recently, the practice of coating fertilizer granules with inert materials has developed to control the rate of leaching of water-soluble fertilizer ingredients from the granules and overcome the caking and sticking tendencies of the granules. However, the use of inert materials as the coating reduces the amount of available nutrients in the fertilizer granules and thus increases the cost thereof to the consumer.

Elemental sulfur is an essential plant nutrient in many crop areas. Its use as a coating agent for granules of water-soluble fertilizer ingredients has been suggested so as to provide an all-nutrient fertilizer composition. However, it has been found that the sulfur coating is too porous and that the leaching rate is about the same as uncoated fertilizer granules.

It has been discovered that the leaching rate of water-soluble fertilizer ingredients from sulfur-coated granules can be effectively reduced by incorporating a small amount of leaching retardant with finely divided solid fertilizer ingredients prior to the formation of discrete sulfur-coated granules and thus provide a slow-release fertilizer composition. The materials and amounts thereof found to be effective leaching retardants for the purposes of this invention are (A) from about 0.01 to about 0.1 weight percent of p,p'-benzylidenebis-(N,N-dimethylaniline), a water-soluble commercial dye commonly known as Malachite Green, and (B) from about 0.0005 to about 0.05 weight percent of a member of the group consisting of carboxymethyl cellulose, guar gum, gum arabic, gum tragacanth, gum karaya, locust bean gum, algin, carrageenin and mixtures thereof.

The novel solid fertilizer composition of the invention thus consists of sulfur-coated granules of water-soluble fertilizer ingredients containing a small amount of a leaching retardant, said retardant and amount thereof being selected from the group consisting of (A) from about 0.01 to about 0.1 weight percent of p,p'-benzylidenebis-(N,N-dimethylaniline) and (B) from about 0.0005 to about 0.05 weight percent of a member of the group consisting of carboxymethyl cellulose, guar gum, gum arabic, gum tragacanth, gum karaya, locust bean gum, algin, carrageenin and mixtures thereof, which is characterized by the slow release of water-soluble ingredients therefrom, and being non-caking and free-flowing.

The water-soluble fertilizer ingredients are those usually used in the preparation of commercial fertilizers such as ammonium nitrate, ammonium sulfate, ammoniated superphosphate, ammonium chloride, mono-ammonium phosphate, diammonium phosphate, calcium cyanamide, calcium nitrate, urea guanidine, guanidine nitrate and nitro guanidine, superphosphate and triple super-phosphate, potassium nitrate, muriate of potash (commercial potassium chloride), potassium metaphosphate, sulfate of potash, potassium phosphate and sulfate of potash-magnesia. Trace elements can also be included therewith.

The granules can be formed and coated by any manner known to the art. Preferably, the retardant and finely divided solid fertilizer ingredients are mixed in the dry state, compression molded to form granules or pellets, and the granules thereafter coated with molten sulfur.

The novel slow release fertilizer compositions of the invention are illustrated by the use of commercial potash (KCl) and urea as the water-soluble fertilizer ingredients of sulfur-coated fertilizer granules.

Comparative samples of finely divided commercial potash containing from 0.0005 to about 0.05 weight percent guar gum and from 0.01 to about 0.1 weight percent Malachite Green were prepared by dry-mixing the potash and the retardants and then compression molding the dry mixture to form commercially-sized elongated cylindrical pellets. Control samples without the leaching retardant were also prepared. All of the pellets were then coated by dipping in molten elemental sulfur to form a sulfur envelope or coating over all of the surface of the pellets and thereby form a coated granule consisting of the core of water-soluble fertilizer ingredients and the sulfur envelope. The granules were then immersed in water and held for an extended period of time. After 24 hours, some of the granules were removed and the amount of leaching that occured was noted by breaking the sulfur envelope and visually comparing how much of the potash remained within the sulfur envelope. Approximately half of the potash in the control samples had been leached out, whereas there was trace leaching in the granules containing the retardants. The presence of pinholes in the sulfur coating was readily indicated in the samples containing the Malachite Green dye. After seven days immersion in the water, the granules containing the guar gum and the dye showed negligible leaching, whereas the control samples showed that substantially all of the potash had leached out of the granule.

In another series of tests similarly conducted, but using urea instead of potash as the water-soluble ingredient, similar results were obtained.

Thus, the present invention provides a means for utilizing sulfur as a coating material for granules of water-soluble fertilizer ingredients used singly or in combination to prepare either simple or mixed slow release fertilizer compositions.

The effectiveness of sulfur as a coating agent can be enhanced by the addition of a sulfur plasticizing agent thereto prior to coating the fertilizer granules. Conventional sulfur plasticizing agents such as polymerized vinyl mercaptans and poly-sulfite compounds are suitable for this purpose. The plasticized sulfur coating produces sulfur-coated fertilizer granules that are more resistant to attrition or damage during manufacture, storage and handling.

Thus, having described the invention, what is claimed is:

1. A solid fertilizer composition consisting essentially of elemental sulfur-coated granules of water-soluble fertilizer ingredients, said granules containing from about 0.01 to about 0.1 weight percent of a leaching retardant consisting of p,p'-benzylidenebis-(N,N-dimethylaniline), said composition characterized by the slow release of said water-soluble ingredients therefrom.

2. The composition of claim 1 wherein said fertilizer ingredient is potassium chloride.

3. The composition of claim 1 wherein said fertilizer ingredient is urea.

References Cited by the Examiner

UNITED STATES PATENTS

| | | | |
|---|---|---|---|
| 2,879,133 | 3/59 | Marti | 71—64 |
| 2,977,203 | 3/61 | Sienkiewicz et al. | 71—64 |
| 2,994,641 | 8/61 | Halpern | 117—100 |
| 3,009,775 | 11/61 | Ladenburg et al. | 117—100 |
| 3,014,783 | 12/61 | Young | 71—64 |
| 3,024,098 | 3/62 | Austin et al. | 71—64 |
| 3,042,718 | 7/62 | Evans et al. | 71—64 |
| 3,100,698 | 8/63 | Horsley et al. | 71—64 |

DONALL H. SYLVESTER, *Primary Examiner.*

ANTHONY SCIAMANNA, *Examiner.*